May 6, 1952 B. G. GELLENBECK 2,595,839
CHILD'S CONVERTIBLE VEHICLE
Filed May 4, 1948 2 SHEETS—SHEET 1
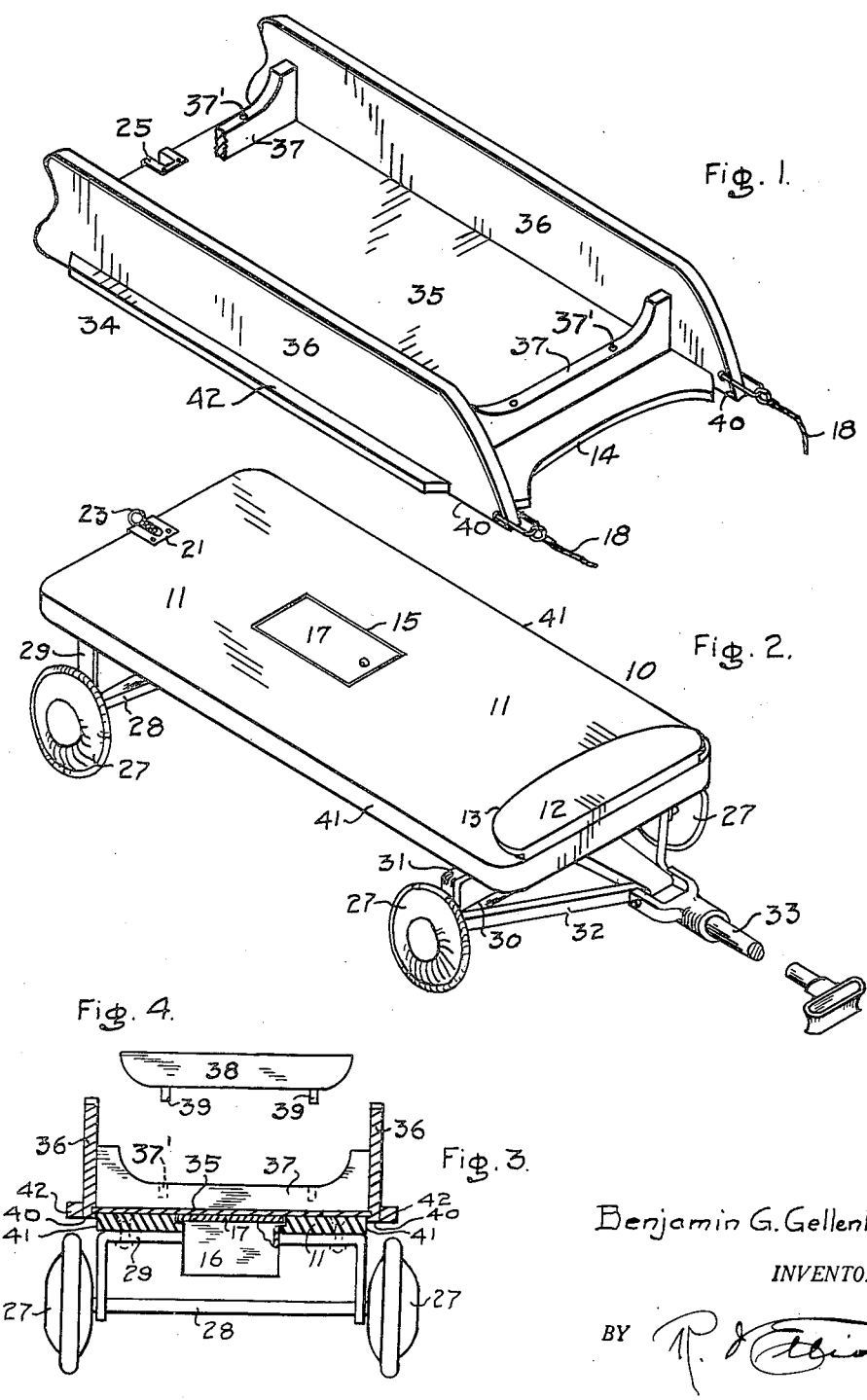
Benjamin G. Gellenbeck
INVENTOR.

May 6, 1952     B. G. GELLENBECK     2,595,839
CHILD'S CONVERTIBLE VEHICLE
Filed May 4, 1948     2 SHEETS—SHEET 2
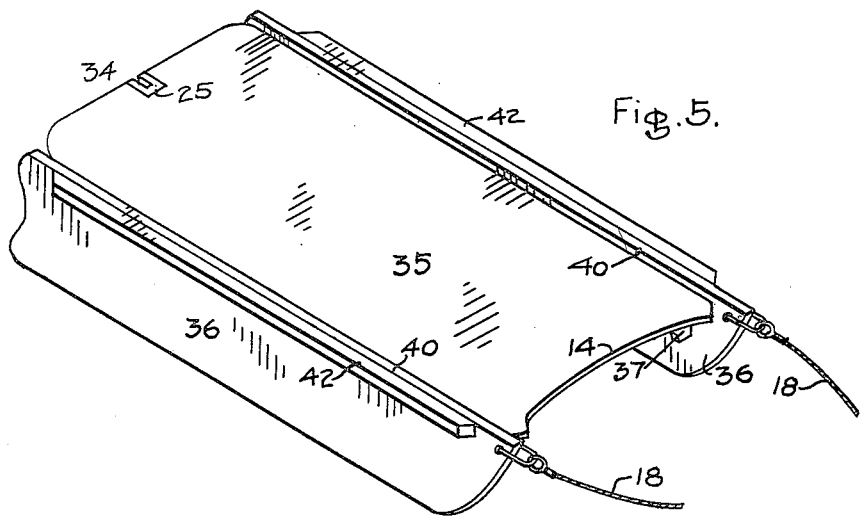
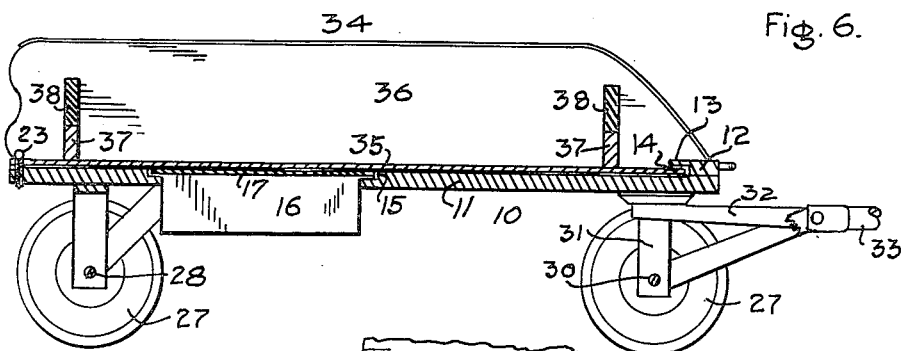
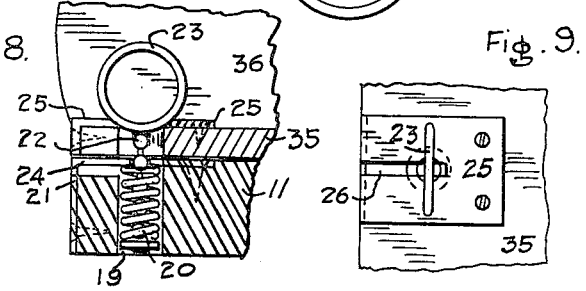
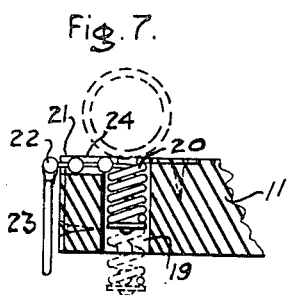
Benjamin G. Gellenbeck
INVENTOR.
BY 

Patented May 6, 1952

2,595,839

UNITED STATES PATENT OFFICE 2,595,839

CHILD'S CONVERTIBLE VEHICLE

Benjamin G. Gellenbeck, Tacoma, Wash.

Application May 4, 1948, Serial No. 25,062

2 Claims. (Cl. 280—7.12)

This invention relates to a child's vehicle composed of a sled and a wheeled vehicle, wherein each may be used independent of the other and is designed for use by larger children than the corresponding vehicle for which I have already made application for letters patent, under Serial Number 10,497, filed February 24, 1948, now Patent No. 2,577,459, granted December 4, 1951.

The objects of my invention are to provide a child's combined vehicle which may be used independent of the presence or absence of snow; which is of substantial construction; which does not require the use of any tools to combine or disassemble the two parts thereof, and yet which are firmly locked together when combined; and which provides a compartment for the reception of the several unused parts thereof.

I attain these and other objects by the devices, mechanisms, and arrangements illustrated in the accompanying drawings, in which—

Fig. 1 is a perspective view of the sled in inverted position; Fig. 2 is a similar view of the wheeled vehicle; Fig. 3 is a cross-section of the two vehicles assembled; Fig. 4 is a side view of the removable part of the cross brace; Fig. 5 is a perspective view of the sled; Fig. 6 is a longitudinal section of the wheeled vehicle and sled when assembled; and Figs. 7, 8 and 9 are views of the releasable latch for locking the two parts together.

Identical numerals of reference refer to the same parts throughout the several views.

The wheeled vehicle 10 comprises a flat board or platform 11, having a front cross-piece 12 which is undercut on its rearward side to form an overhanging flange 13 adapted to receive and hold the front edge 14 of the hereinafter described inverted sled, to firmly hold the said parts together. This platform 11 is also provided, at any convenient position, with an opening 15 under which a suitable receptacle 16 may be fastened, said receptacle having a closure 17 fitting in the said opening 15, said receptacle 16 being adapted to receive the sled rope 18 and the removable parts of the cross braces and other paraphernalia as may be desired. This platform 11 is also provided with the latch or lock, illustrated in Figs. 7, 8 and 9 by which the inverted sled is secured onto the platform 11.

This latch is mounted in a hole 19 near the rear edge of the platform 11, and comprises a spring 20, held down by a plate 21, secured on top of the platform 11, and a chain 22 fastened to the lower end of the said spring 20, and having a ring 23 secured to its upper end. The plate 21 is provided with a slot 24 adapted to permit the chain 22 to lie therein so that the ring 23 may extend down over the edge of the plate 21 (Fig. 7), when the sled has been removed from the platform 11. The rear edge of the sled is provided with a corresponding slotted plate 25 and with a slotted hole 26 adapted to permit the chain 22 to pass thereinto and be held down by the compression of the spring 20 on the ring 23 pressing on the plate 25, thus firmly holding the rear parts of this combined vehicle together.

The platform 11 is mounted on four wheels 27, the rear pair being mounted on the rear axle 28 which is supported in the fixed frame 29 secured under the platform 11. The front pair are similarly mounted on an axle 30 mounted in a frame 31, pivotally mounted under the platform 11 and provided with a forward extension 32 to which the handle 33 is suitably secured.

The sled 34 forms the box for the wagon, when it is secured thereto in inverted position, is in general of the usual form of a child's sled, except that the platform 35 is secured in side grooves in the runners 36, which therefore extend slightly above the level of the platform 35, as seen in Figs. 3 and 5. The said platform 35 is wider than the above described platform 11. The cross braces 37 extend across the sled on the under side of the platform 35 and are secured thereto and to the runners 36. These braces 37 are cut away on a curved line (Figs. 1, 3) in order that they will not contact the snow under the sled. This cut away portion may be filled, when the sled is inverted, by the removable pieces 38 secured thereto by the dowels 39 fitting in suitable holes 37' in the braces 37. When not in use the pieces 38 may be stowed in the receptacle 16 of the wheeled vehicle.

The front edge 14 of the platform 35 fits under the overhang 13 of the cross piece 12, when the sled is inverted and its platform 35 rests on the platform 11. In this position the upper edges 40 of the runners 36 fit over the side edges 41 of the platform 11 (Fig. 3) and the latch plate 25 fits over the plate 21 so that the two bodies may be locked together by the chain 22 (Fig. 8). Hand rails 42 may be secured to the upper edges of the sled runners 36.

In this inverted position, when the sled 34 is locked on the wheeled vehicle 10, the runners 36 form the sides of the box, and the braces 37, with the parts 38 placed thereon, form the ends of the wagon box thus formed. This wagon box is held down by the overhanging flange 13 and by the latch spring 20, and is held from lateral movement by the engagement of the edge 40 of the runners 36 with the side edges 41 of the platform 11.

Thus it will be seen that I have provided a substantial vehicle which may be used as a scooter or a wagon, and whose wagon box portion may be used as a sled.

It is, of course, understood that changes may be made in the details of construction of the various parts of my improved convertible vehicle, without departing from the spirit of my invention as outlined in the appended claims.

Having, therefore, described my invention, what I claim and desire to secure by Letters Patent, is:

1. A convertible vehicle comprising a wheeled platform and an inverted sled forming the box for said vehicle; a rearward extending flange secured on said platform and extending over the front edge of said inverted sled; a releasable spring latch mounted on the rear end of said platform and engaging and holding said inverted sled down on said platform; together with downward extending sides of said inverted sled engaging the side edges of said platform to hold said inverted sled from lateral displacement on said platform.

2. In a convertible vehicle, the combination with a wheeled platform; of a cross-piece secured to the upper side of the front end of said platform; a flange extending rearward from and across said cross-piece and overhanging said platform; a latch mechanism mounted on the rear end of said platform; and a removable box structure having a sled platform and having its sides extending down below said last platform, said box structure lying on said first platform and extending under said flange and secured to said platform by said latch, and secured from lateral displacement by the engagement of the box sides with the side edges of said first platform.

BENJAMIN G. GELLENBECK.

REFERENCES CITED

The following references are of record in the file of this patent:

UNITED STATES PATENTS

| Number | Name | Date |
| --- | --- | --- |
| 185,014 | Brooks | Dec. 5, 1876 |
| 412,866 | Whitney | Oct. 15, 1889 |
| 684,875 | Simonson | Oct. 22, 1901 |
| 863,358 | Chalfant | Aug. 13, 1907 |
| 1,075,336 | Custer | Oct. 14, 1913 |
| 1,370,604 | McLaren | Mar. 8, 1921 |
| 1,371,246 | John | Mar. 15, 1921 |
| 1,554,413 | Coppage | Sept. 22, 1925 |
| 1,602,146 | Callison | Oct. 5, 1926 |
| 1,681,853 | Hance | Aug. 21, 1928 |
| 1,728,587 | Aldridge | Sept. 17, 1929 |

FOREIGN PATENTS

| Number | Country | Date |
| --- | --- | --- |
| 187,529 | Great Britain | Oct. 26, 1922 |
| 187,546 | Great Britain | Oct. 26, 1922 |